Oct. 23, 1956  G. I. THOMAS  2,767,908
ELECTRONIC DIGITAL COMPUTING MACHINES
Filed Aug. 14, 1951  7 Sheets-Sheet 6

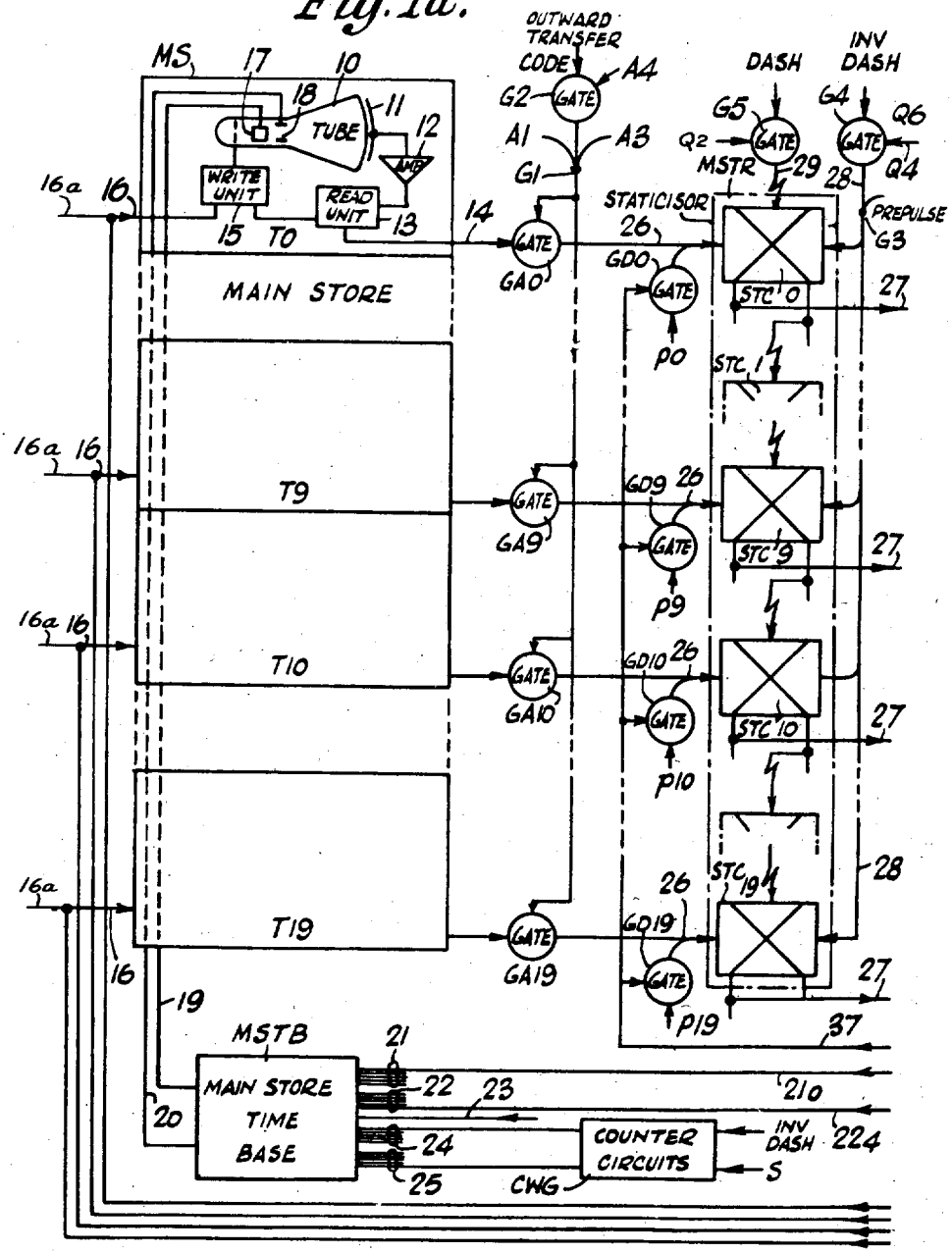

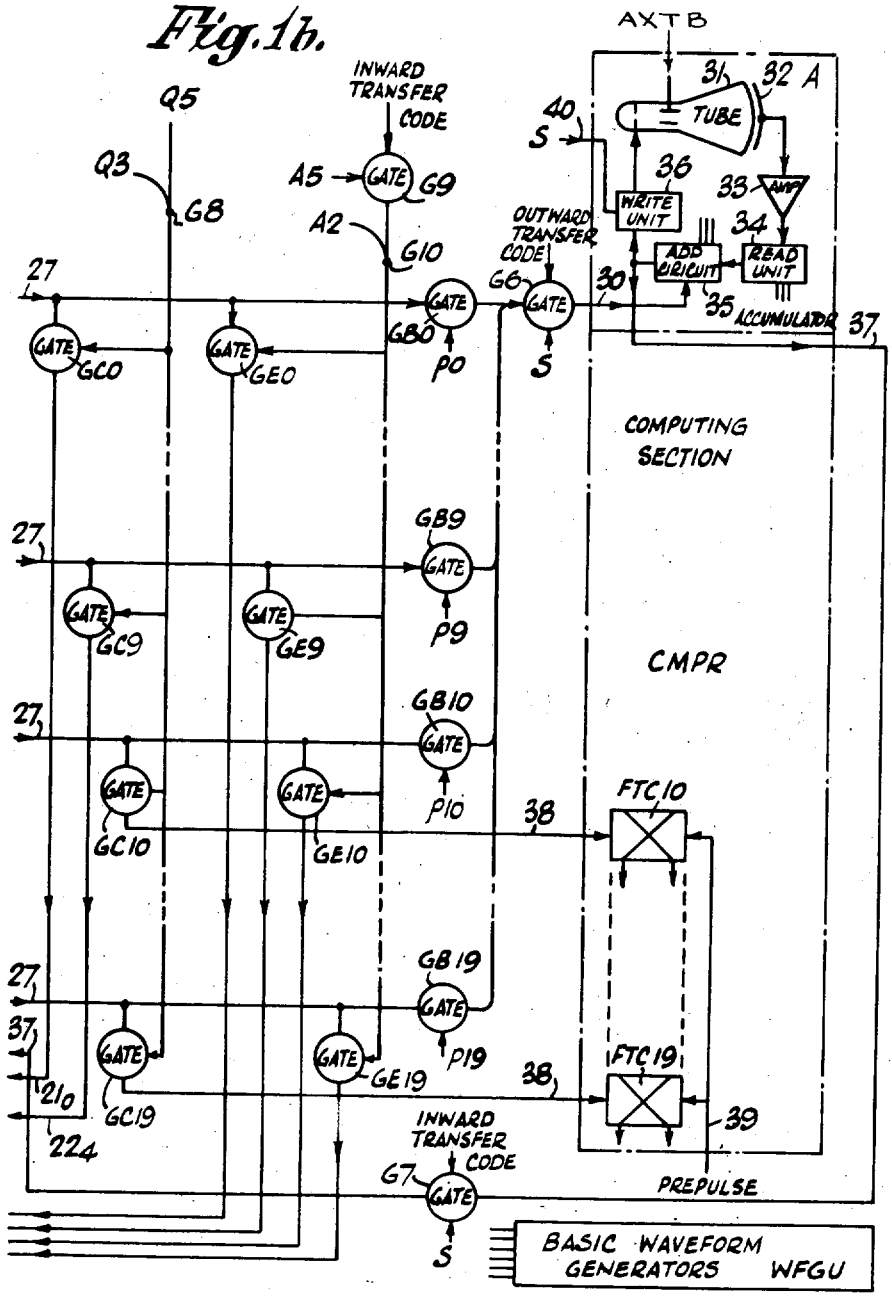

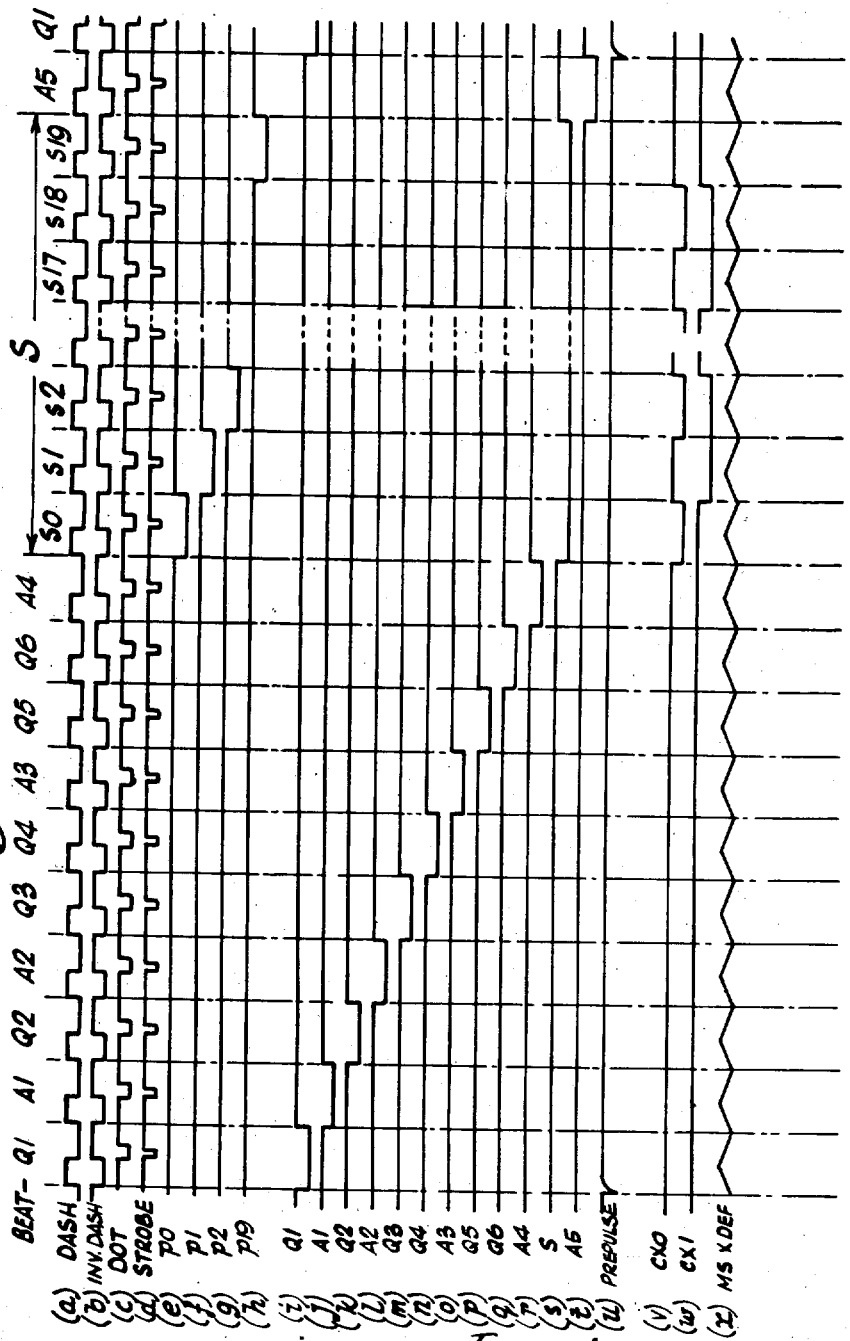

Inventor
G. I. Thomas
By Moore and Hall
Attorneys

Oct. 23, 1956 G. I. THOMAS 2,767,908
ELECTRONIC DIGITAL COMPUTING MACHINES
Filed Aug. 14, 1951 7 Sheets-Sheet 7

INVENTOR:
GRAHAM ISAAC THOMAS
By Stevens, Davis, Miller & Mosher
ATTORNEYS

United States Patent Office 2,767,908
Patented Oct. 23, 1956

2,767,908

ELECTRONIC DIGITAL COMPUTING MACHINES

Graham Isaac Thomas, Hollinwood, England, assignor to National Research Development Corporation, London, England, a corporation of Great Britain Application August 14, 1951, Serial No. 241,732

Claims priority, application Great Britain August 18, 1950

13 Claims. (Cl. 235—61)

This invention relates to electronic digital computing machines and is more particularly, although by no means exclusively, concerned with computing arrangements which employ storage or memory devices of the cathode ray tube or Williams type.

Examples of such memory devices and of computing apparatus adapted for use therewith are to be found in the following publications. Where reference is made subsequently in this specification to any of these prior specifications it will, for convenience, be by means of the allotted reference letter only.

A.—Proceedings of the Institution of Electrical Engineers, vol. 96, part III, March, 1949, pages 81–100, "A Storage System for Use with Binary Digital Computing Machines," by F. C. Williams et al.

B.—"Nature," vol. 164, No. 4,173, October 22, 1949, pages 684—687, "The University of Manchester Universal High Speed Digital Computing Machine," by T. Kilburn.

There are at present, two main types of electronic digital computing machines, namely, the so-called "series" type, in which the numbers upon which the arithmetical operations are performed and the similar coded instructions which control each computing step are each represented by a train of digit-representing electric pulse signals passing sequentially along a single channel, the significance of the digits being determined by their time of occurrence in the train and the so-called "parallel" type, in which the electric signals representing the various digits of such numbers or instructions appear simultaneously in separate channels, the significance of a digit being determined by the channel which it occupies.

Generally speaking, the "series" type of machine is relatively simple compared with the "parallel" type but is slow in operation, while the increased speed of operation of the latter type is obtained at the expense of a more or less proportional increase in the equipment required.

The general operation of an electronic digital computing machine in effecting a computation may be divided into the following successive steps, namely:

(1) A "Control Instruction" stored in the machine selects the computing instruction to be obeyed.

(2) The computing instruction to be obeyed, called the "Present Instruction," selects the "address" or addresses of the data item to be used in the operation, and sets up the requisite computing circuits.

(3) The required operation is performed.

In steps 1 and 2 it will be apparent that an instruction takes over control of the machine. For this purpose it is generally necessary to use the stored numbers which represent instructions in coded form to set up circuit arrangements, known as static registers or staticisors. These circuit arrangements produce a set of D. C. control potentials which correspond to the digits of the instruction, and are used to operate switching circuits of the machine. The important point to be observed here is that the instructions, whatever their original form, are used to set up a number of control potentials which are operatively effective in a number of parallel circuits simultaneously.

It is proposed in the present invention to take advantage of this fact by arranging that the aforesaid steps 1 and 2 are performed by apparatus of the "parallel" type, whilst in order to avoid undue complexity of equipment the computing operation of step 3 is performed by apparatus of the "series" type.

According to the invention, in an electronic digital computing machine the steps of selecting a computing instruction to be performed, selecting the address or addresses to be used in the operation, and selecting and preparing the computing circuits, are performed by apparatus operating in the parallel mode in which all the digit signals representing the numbers are transmitted simultaneously along a plurality of separate transfer channels and wherein the significance of said digits is determined by the channel occupied by each digit, and the step of carrying out the required computing operation is performed by apparatus operating in the series mode in which all the digit signals representing the numbers are transmitted sequentially along a single transfer channel and wherein the significance of said digits is determined by the order of their occurrence in time.

The obeying of a single instruction by the machine may be regarded as the fundamental unit or cycle of operation of the machine and the time interval involved in such obeying of an instruction is conveniently referred to as a "bar." Since the obeying of an instruction involves a number of separate consecutive operative steps within the machine, each of which requires a finite time period, it is convenient to divide each "bar" into a number of sub-cycles or "beats," each representing the interval required to perform one such step. In the particular embodiment of the present invention described hereinafter a rhythm of twelve such beats to a bar is used consisting of five so-called "Action" beats (A1–A5) in which use of the memory device or store may be involved, interspersed with six, so called, "Quiescent" beats (Q1–Q6) in which the store plays no part, and a so-called "Scanning" beat (S), in which conversion of a number to or from serial form takes place.

In order that the various features of this invention may be more readily understood illustrative embodiments thereof will now be particularly described with reference to the accompanying drawings in which:

Figs. 1a and 1b, in combination, represent a block schematic diagram of one particular computing machine embodying the invention.

Fig. 2 comprises a series of waveform diagrams illustrative of a number of controlling potentials available within the machine of Fig. 1.

Figure 8a illustrates the symbol used in the block schematic diagrams referred to above for denoting an "and" or coincidence gate while

Figure 9a is an illustration of the symbol used in the above mentioned block schematic diagrams for denoting a buffer circuit or "or" gate while

Figure 10a is an illustration of the symbol used in the above mentioned block schematic diagrams for denoting the inclusion of a differentiating network in a circuit lead while

Figure 11A:
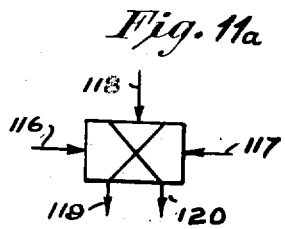
Figure 11B:
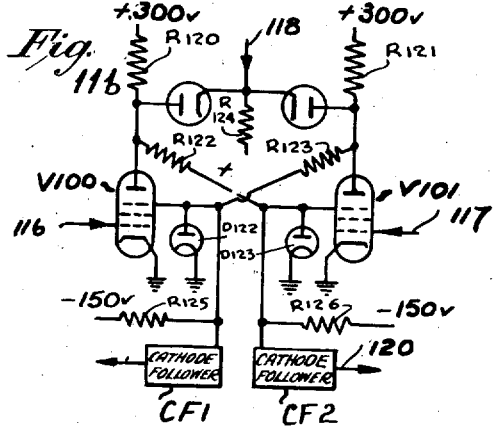

Figure 11a similarly illustrates the symbol used in the above mentioned block schematic diagrams for denoting a two-stable-state trigger circuit while Figure 11b illustrates a suitable form of such a trigger circuit.

Before proceeding with a description of the particular embodiment of the invention illustrated in the drawings, reference will first be made to the interpretation of the symbols shown in Figures 8a, 9a, 10a and 11a in the block schematic drawings of Figures 1a, 1b, 3, 4, 5 and 6. Such symbols are used where possible throughout the drawings for the purpose of simplifying the illustration and understanding of the arrangement.

Figure 8A:
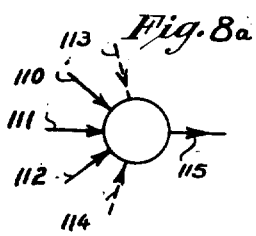

Referring first to the symbol shown at Figure 8a, denoting what is known in the computer art as an "and" or coincidence gate circuit, such coincidence circuit requires an active or energising input on every one of its input control leads 110, 111, 112, 113, 114 before an output potential is developed on its output lead 115. Such devices, which are described in some detail by C. H. Page in "Electronics," September 1948, pages 110–118, "Digital Computer Switching Circuits," may be made with any desired number of controlling inputs, the number of inputs being indicated by the number of leads with arrow heads pointing towards the circle of the symbol.

Figure 8B:
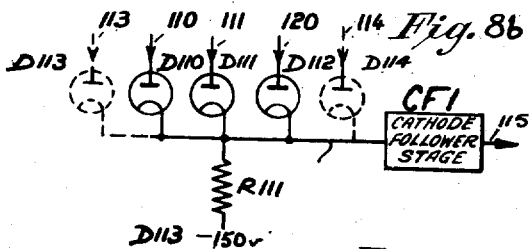
Figure 8b is a more detailed circuit diagram of one suitable form of such "and" gate circuit.

In the present machine, in which the operating waveforms are assumed to have an inactive level of approximately earth potential and an active level of, say, 20–30 volts negative to earth, a practical form of such an "and" gate circuit is shown in Figure 8b where each of the controlling input leads 110, 111, 112, 113, 114 is connected to the anode of a related diode D110, D111, D112, D113 and D114. All of the diode cathodes are interconnected with each other and joined to one end of a load resistance R111 whose opposite end is connected to a source of negative potential −150 v. The common cathode point of the various diodes (whose number is varied according to the number of controlling inputs) is also joined to the input terminal of cathode follower valve stage CF1 which is of wholly conventional form and whose cathode output point is connected to the gate output lead 115.

In the operation of such an "and" gate circuit, the common cathode connection of the diodes normally rests at about earth potential, one or more and probably all of the diodes being conducting. The output on lead 115 is accordingly at earth potential under such conditions. When any one of the controlling input leads is supplied with negative potential by the presence of an active waveform pulse thereon, that diode ceases to conduct but no effect is produced upon the output lead 115 as any remaining diode whose anode is still at the raised earth potential level still provides a path for current flow from earth through lead resistance R111 to the source −115 v. Only when every one of the controlling input leads is driven to the active negative-going level at the same time will the common cathode point of the diodes move to the same negative potential level thereby driving the input to the cathode follower stage negative and causing the development of a negative-going output on the lead 115.

Examples of the use of such symbol shown in Fig. 8a are to be found in connection with the gate devices G2, G4, G5, GA0 . . . GA19 and GD0 . . . DG19 in Fig. 1a, devices G6, G7, G9, GC0 . . . GC19, GE0 . . . GE19 and GB0 . . . GB19 in Fig. 1b, device G11 in Fig. 3, devices G12, G13 and G14 in Fig. 4, devices G15 . . . G25 in Fig. 5 and devices G29 and G30 in Fig. 6.

Figure 9A:
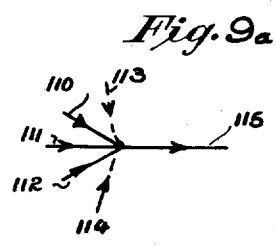

The symbol shown in Fig. 9a denotes what is known in the computer art as a buffer circuit or "or" gate by which an active or energising input on any one of its input control leads 110, 111, 112, 113, 114 produces an output potential on its output lead 115 regardless of the presence or absence of a similar active or energising input of any other one of the control leads. Such output potential is produced without any back-flow from the active input lead to any of the other and non-active input leads. Such devices are also described in some detail by C. H. Page in the "Electronics" reference quoted previously. As with the "and" gate of Fig. 8a the number of inputs is variable according to requirements.

Figure 9B:
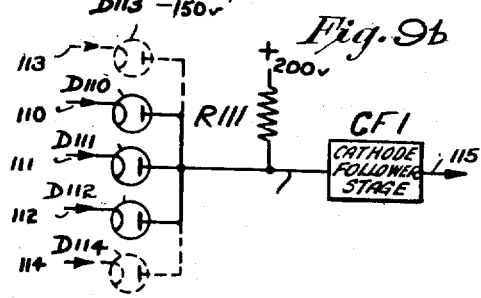
Figure 9b is a more detailed circuit diagram of one suitable practical form of such buffer circuit.

A practical form of such a buffer circuit, suitable for use in the present machine, is shown in Fig. 9b and comprises diodes D110, D111, D112, D113, D114, one for each input lead. Each input lead 110 . . . 114 is connected to the cathode of the related diode D110 . . . D114 while all of the diode anodes are interconnected and joined to one end of a load resistance R111 whose opposite end is connected to a source of positive potential +200 v. The common anodes are also connected to the input terminal of a conventional cathode follower stage CF1 whose cathode output point is joined to the buffer output lead 115.

In the operation of such a buffer circuit when all of the input leads are supplied with waveforms at their machine earth potential level, the potential of the common anode point is similarly at earth level due to the potential drop across the resistance R111 and the output potential on lead 115 is similarly at earth level. Upon the arrival of a negative-going pulse of, say, −20 v. amplitude on any input lead, the cathode of the related diode is taken to similar potential level and the current flow from the positive potential source +200 v. through resistance R111 now passes through that diode alone with the result that the common anode point drops to −20 v. All of the other diodes then become cut off. The lowered output potential at the common anode point is applied to the input of the cathode follower stage CF1 and produces a similarly lowered output potential on the output lead 115.

Figure 6:
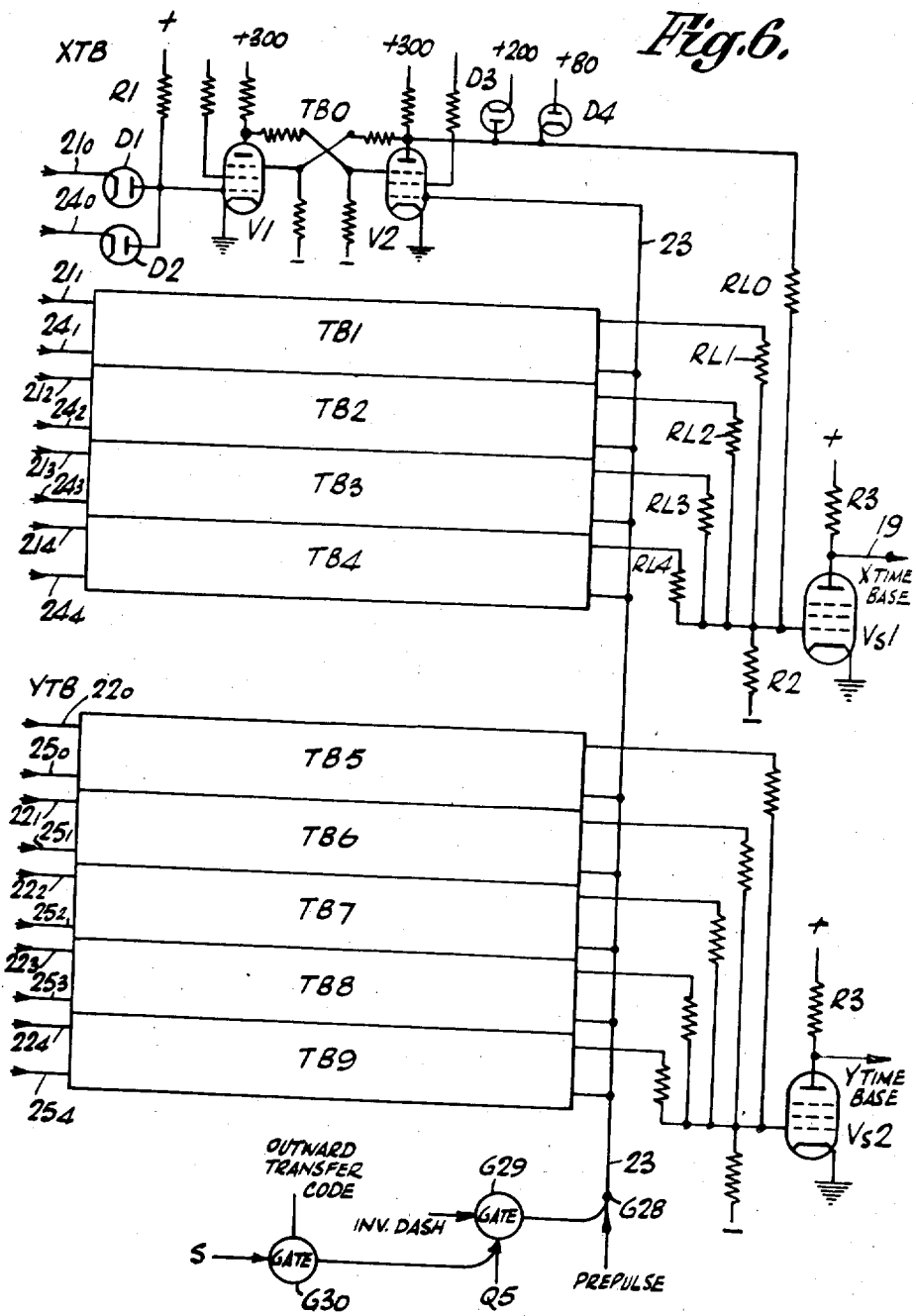
Fig. 6 is a simplified and partially schematic circuit diagram of one form of time-base waveform generator for use with the cathode ray tube storage devices in the main store of Fig. 1.

Examples of such buffer circuits are to be found at various places in the other figure of the drawing but in view of their passive character, not all are specifically provided with reference numerals. In Fig. 1a reference numerals G1 and G3 indicate two such buffer devices while in Fig. 1b references G8, G10 likewise indicate such buffer circuits. In Fig. 6 a buffer circuit is indicated at G28.

Figure 10A:
Figure 10B:
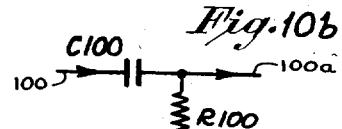
Figure 10b illustrates a suitable practical form of such differentiating network.

The symbol shown in Fig. 10a indicates the inclusion in a conductor of a normal differentiating network of which a conventional and suitable form is shown in Fig. 10b as comprising a capacitor C100 connected in series with the conductor concerned, 100 with the output side 100a of the conductor joined by way of a leak resistance R100 to a suitable potential point, normally earth. In the well known manner of operation of such a differentiating network the arrival of a rectangular pulse of, say, negative polarity, first charges the condenser C100 on the arrival of its steep fronted leading edge, the flow of charging current through resistance R100 causing the output connection 100a to be driven negative. Thereafter as the flow of charging current ceases there is an exponential rise of the potential on the output lead 100a back to its normal resting level, e. g. earth potential if the resistance R100 is connected to earth. Thereafter upon arrival of the similar steep fronted positive-going trailing edge of the pulse, the condenser C10 is discharged and the discharge current through resistor R100 in the opposite direction produces a positive-going rise of potential on the output lead 100a which, in similar manner, subsequently decays exponentially to the normal, e. g. earth potential, resting level. From a single rectangular voltage pulse there are thus produced two sharp spikes, the first of a polarity which is the same as that of the applied pulse and the other, at a later time instant, of the opposite polarity. In arrangements utilising such differentiating networks in the present application, which operates throughout with negative-going triggering pulses, it is only the negative-going spike which is normally used.

Examples of the inclusion of such a differentiating network are to be found in the central reversing input leads to the various trigger circuits STC0 . . . SCT19 in Fig. 1a and to the similar inputs to trigger circuits TC15 . . . TC24 in Fig. 5 and to the resetting inputs to trigger circuits TC1 . . . TC12 in Fig. 4.

The symbol shown in Fig. 11a denotes what is now well known in the art as an electronic two-stable-state trigger circuit, often termed a bistable multivibrator. Such circuits are fundamentally of the Eccles-Jordan variety as is described, for example, in connection with Figs. 4–8, page 174 of "Ultra High Frequency Techniques" by Brainerd et al. (published by Chapman and Hall) 1942, and also in "Waveforms," M. I. T. Radiation Laboratory Series, vol. 19, 1949 (published by McGraw-Hill) in connection with section 5.4, pages 164–166.

Such trigger circuits have two stable conditions or states, one of which can be produced by the application of a negative triggering pulse on the left hand or triggering input lead 116, Fig. 11a, and the other of which can be produced by the application of a negative resetting pulse on the right hand or reset input lead 117. The two states are known respectively as the triggered or "on" state and the reset or "off" state. In some applications it is desirable merely to be able to reverse the trigger circuit from whatever state it happens to be in to the opposite state by the application of a similar negative-going triggering pulse on a single input lead; such a reversing input connection is shown at the top of the symbol by reference 118. Such trigger circuits provide two anti-phase outputs on leads 119 and 120. When the trigger circuit is in its triggered or "on" state, i. e. after the application of a negative pulse on lead 116 or the application of a reversing pulse on lead 118 when the trigger circuit was previously in its resetting or "off" state, the output potential on lead 119 moves negatively whereas that on lead 120 moves positively. In the opposite or "off" state, caused by the application of a resetting impulse on lead 117 or the application of a further reversing pulse on lead 118, the output potential on lead 119 moves positively whereas that on lead 120 moves negatively. In the present application the output potentials on leads 119 and 120 are arranged so that they normally have their more positive or resting level at approximately earth potential and a lowered level of say −20 v. Thus when the trigger circuit is in the "on" state, the output lead 119 will be at −20 v. and output lead 120 at earth whereas when the trigger circuit is the "off" state the output lead 119 will be at earth and the output lead 120 will be at −20 v.

A practical form of trigger circuit construction adapted for use in connection with the present invention is shown in Fig. 11b which will be found closely to resemble that of Figs. 4–8 of the aforementioned Brainerd et al. reference with additional reversing input arrangements as shown in section 5.4 of the M. I. T. "Waveforms" reference. Such practical circuit arrangement comprises two pentode valves V100 and V101 having their respective cathodes connected to earth and having their respective control grids connected directly to the input triggering and input resetting leads 116, 117. The anode of valve V100 is joined by way of anode load resistance R120 to a source of positive potential +300 v. while the anode of valve V101 is similarly joined to the same source of positive potential +300 v. through anode load resistance R121. The anode of valve V100 is cross-connected to the suppressor grid of valve V101 by way of a D. C. path comprising resistance R122 while the anode of valve V101 is similarly cross-connected to the suppressor grid of valve V100 by way of a D. C. path comprising resistance R123. The screen grids are each supplied with the normal operating screen potential although the arrangements for doing this are not shown for sake of clarity. In addition the anode of valve V100 is connected to the anode of a diode D120 and the anode of valve V101 to the anode of a diode D121. The two diode cathodes are interconnected and joined to the reversing input lead 118 and also to one end of a load resistance R124 whose opposite end is connected to a source of positive potential +250 v. The suppressor grid of valve V100 is connected to the anode of a diode D122 whose cathode is connected to earth and also by way of a resistance R125 to a source of negative potential −150 v. The suppressor grid is also connected to the input terminal of a conventional cathode follower stage CF1 whose cathode output point is joined to the output lead 119. In similar manner the suppressor grid of valve V101 is joined to the anode of a diode D123 whose cathode is earthed and also by way of resistance R126 to a source of negative potential −150 v. Such suppressor grid is likewise connected to the input terminal of a further conventional cathode follower stage CF2 whose cathode output point is connected to output lead 120.

In the operation of such a trigger circuit each control grid of the valves V100, V101 is normally at earth potential so that space current is turned on. In the re-set or "off" state of the trigger circuit, valve V100 is conducting to its anode but valve V101 is cut off at its suppressor grid. This is due to the lowered anode potential of valve V100 being communicated to the suppressor grid of valve V101 while the similarly raised anode potential of valve V101 is communicated to the suppressor grid of valve V100. The resistances R123 and R125 between the anode of valve V101 and the source −150 v. are adjusted so that when valve V100 is thus turned on, its suppressor grid potential and hence the output potential on lead 119 is at approximately earth level. Correspondingly with similar values for the resistances R122 and R126 the suppressor grid on valve V101 and the output potential on lead 120 is at a negative level of, say, −20 v. The application of any negative resetting pulse on lead 117 is, in this condition, ineffective since the valve V101 is in any case cut off at its suppressor grid. Similarly the application of a positive spike or pulse on the same lead 117 is likewise ineffective since the valve is, inherently, already turned on at its control grid. All space current is passing to the screen grid. The application of a negative triggering input pulse on the left hand triggering input lead 116 will, however, momentarily cut off valve V100 at its control grid thereby blocking all space current and producing a corresponding positive rise of potential at its anode. This is immediately communicated to the suppressor grid of valve V101 which promptly commences to pass current to its anode with consequent fall of its anode potential; this fall is then communicated back to the suppressor grid of valve V100 and, under the usual cumulative effect of such relaxation oscillator circuits, valve V100 immediately becomes cut off at its suppressor grid and valve V101 becomes fully turned on to its anode. As a result of this the suppressor grid potential of valve V100 is lowered to −20 v. causing a correspondingly lowered output potential on lead 119 while the suppressor grid of valve V101 is raised to about earth potential producing a correspondingly raised output on lead 120. The application of any further pulse either negative-going or positive-going on lead 116 is now ineffective to produce any change of the circuit state but the application of a negative-going resetting pulse on lead 117 will immediately cause reversal of the circuit from its existing "on" or triggered condition to its previous "off" or reset state in similar manner. The arrival of any negative-going pulse on lead 118 will pass through the particular one of the two diodes D120, D121 whose anode happens to be at the more positive level. Thus if the trigger circuit is in the resent or "off" state where valve V100 is conducting and valve V101 is turned off, the pulse will pass through the diode D121 and thence by way of resistance R123 to the suppressor grid of valve V100 thereby blocking anode current flow in the latter and causing a reversal of the state of the trigger circuit by a repetition of the events previously described whereby the circuit will thereafter rest in the triggered or "on" state with valve V100 cut off and valve V101 fully turned on. The next arriving pulse on lead 118 will now pass through diode D120 and will be effective upon the suppressor grid of valve V101 to cause a similar repetition of events to reverse the trigger circuit back to its initial "off" or reset condition with valve V101 cut off and valve V100 turned on.

Numerous examples of such trigger circuits are to be found in the drawings such as at trigger circuits STC0 ... STC19 in Fig. 1a, FTC10 ... FTC19 in Fig. 1b, TC1 ... TC13 in Fig. 4 and TC15 ... TC24 in Fig. 5.

A broad description of the general arrangement and operation of the illustrated embodiment of the invention will first be given with reference to Figs. 1a and 1b. This embodiment, of simple character, is arranged to deal with 20-digit binary numbers.

The main store or memory device MS is of the parallel type comprising twenty separate cathode ray tube storage devices T0 ... T19, each of the kind described in the aforesaid reference A. One device only, T0 is indicated in any detail as including a cathode ray tube 10 with its pick-up electrode 11 feeding signals to an amplifier 12 whose output is applied to a read unit 13 from which an external output signal is available on lead 14. Another output from the read unit 13 is fed to a write unit 15 to which may also be supplied external input signals over lead 16 and the output from this write unit serves to control the beam of the tube 10 either by modulation of its intensity or by alteration of its focus in the manner described in the aforesaid reference A to effect the required information storage. The read unit 13 and write unit 15 correspond to what is shown as a "gate" in Fig. 15 of reference A and the detailed circuit arrangement of such read and write units may conform to that shown in Fig. 32 of the same reference A, the read output signal lead 14 being that connected to the Read Output terminal in the said Fig. 32 of the reference and the writing input lead 16 being that connected to the Write Input terminal in the said Fig. 32 of the reference. Each of the other tube circuits T1 ... T19 are exactly similar.

Each digit of each binary number held in the main store MS is stored in a separate tube, the order of significance of the digits stored in the respective tubes being represented by the suffix numerals 0, 1 ... 18, 19 of the tube designation T$n$ according to the ascending powers in the binary scale $2^0, 2^1 ... 2^{18}, 2^{19}$. Each tube T$n$ has a storage capacity of thirty-two lines each containing thirty-two digits, and all the digits of a particular number are arranged to occupy corresponding positions in each of the tubes.

Since the selection of a particular number in the main store MS involves the selection of the same storage position or address in each of the tubes simultaneously, the same X- and Y-deflection potentials for the X and Y deflecting plates 17, 18 of the tubes are applied in parallel over leads 19 and 20 respectively to all the tubes from a time base unit indicated generally at MSTB. This unit will be described in detail later. Thus, by the provision of the appropriate X- and Y-deflection potentials on leads 19, 20, a selected number will be made available in parallel form on the output leads 14 of the store or, alternatively an input number may be applied for storage in parallel form on the input leads 16. These input numbers may arrive, as described later from another part of the device according to the invention or alternatively may be supplied, e. g. as an initial input to the store, upon the leads 16a, Fig. 1a.

The X-deflection potential on lead 19 is capable of being set at any one of thirty-two different and stepped levels under the control of a group of five input leads 21 while the Y-deflection potential on lead 20 is similarly capable of being set at any one of thirty-two different and stepped levels under the control of a second group of five input leads 22. Resetting of the time-base output potentials to the position of storage location 0 in line 0 of each tube may be effected at any time by appropriate pulse energisation of the resetting lead 23. As will be explained in detail later, provision is made for the systematic regeneration of the stored information in the manner required by these cathode ray tube devices and as described in the aforesaid reference A and for this purpose an alternative control for both X and Y time-base circuits is afforded by the groups of five leads 24 and 25 respectively from a counter waveform generator CWG to be described later.

The time base circuits are arranged to be capable of retaining the configuration to which they are set by any control inputs after such controlling influences have been removed.

The parallel output signals from the main store MS on leads 14 are applied by way of individual "and" gate circuits GA0–GA19 to a main store staticisor MSTR. The gate circuits GA0–GA19 are controlled by potentials fed through the "or" or buffer gate G1 and the "and" gate G2. The staticisor MSTR consists of twenty trigger circuits, STC0 ... STC19 of the bistable type each comprising two valves or valve sections suitably cross-connected, e. g. in the manner of an Eccles-Jordan trigger circuit as already referred to in connection with Fig. 11. The trigger circuits STC0–STC19 are also interconnected as shown to form a binary counting arrangement, each circuit subsequent to the first being triggered whenever the preceding stage changes from its "on" or "I" to its "off" or "O" indicating state. The presence of any "I" indicating signal on the input triggering lead 26 of any trigger circuit STC0–STC19 serves to set it into the "I" condition whereupon its "I" output lead 27 will provide a negative-going output signal. Resetting of any trigger circuit back to its "off" condition can be effected by suitable application of a resetting pulse on the common reset lead 28 supplied through "or" gate G3 and "and" gate G4. In addition to such set and reset controls the first trigger circuit STC0 is provided with a common trigger input lead 29 supplied through "and" gate G5 by which a pulse serving to advance the setting of the complete counter chain formation may be applied.

The output leads 27 from each trigger circuit of the staticisor MSTR are connected through individual "and" gates GB0 ... GB19 and an input control gate G6 of the "and" type to a single input lead 30 of the computing section CMPR of the machine which operates in the serial mode. For the sake of simplicity this section CMPR is shown as including only a simple adding type accumulator A and a series of bi-stable trigger circuits FTC10–FTC19 controlled by the "function" digits of an instruction word but it will be understood that this section may include any of the other elements such as a multiplier, B-tube, divider and other means such as are described in said reference B.

The accumulator A of the computing section CMPR utilises a cathode ray tube store including tube 31 with its signal pick-up electrode 32 feeding an amplifier 33 whose output supplies read unit 34. The output from such read unit constitutes one input to a serial mode adding circuit 35 whose other input is supplied from the input lead 30 of the computing section. The sum output from the adding circuit 35 is applied to the write unit 36 which controls the beam of the tube 31 in the known manner. The output from the adding circuit 35 is also made available externally by way of output lead 37.

Figure 4:
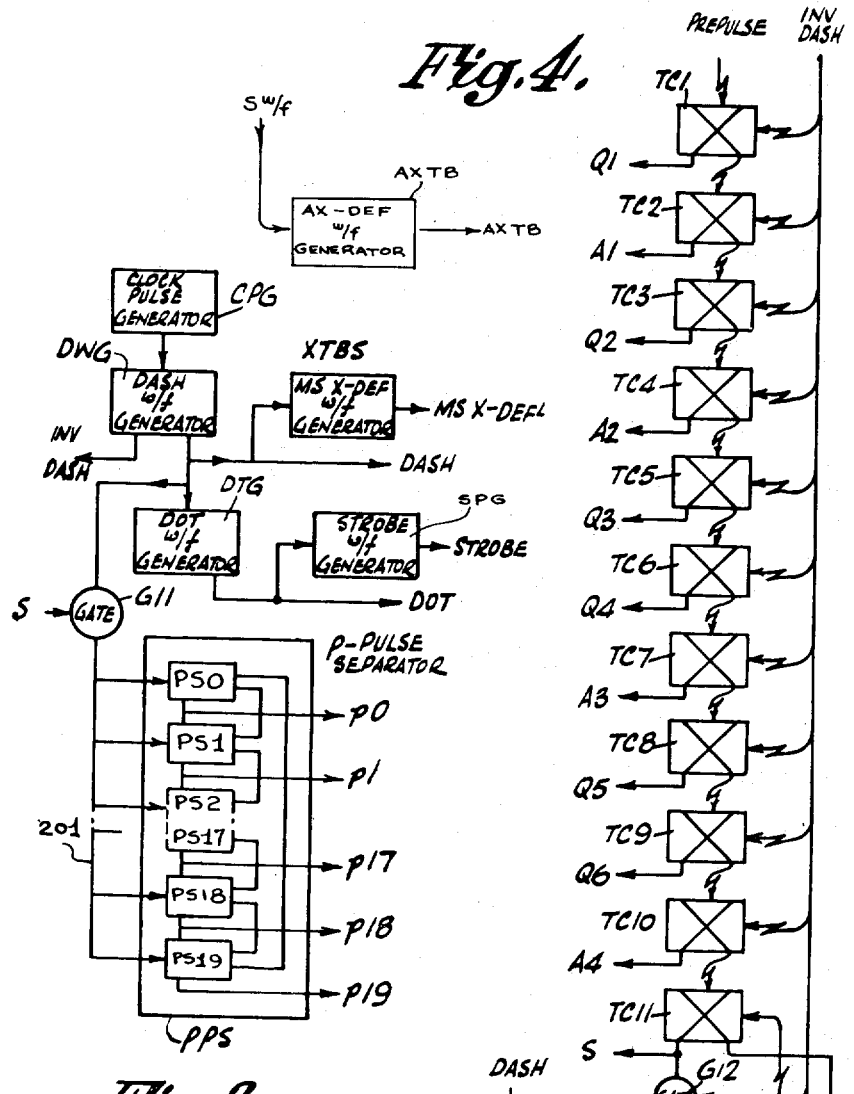
Fig. 4 is a similar block schematic diagram of the arrangements for generating the various beat or rhythm controlling waveforms of the machine.

The tube 31, again for simplicity, is shown as using only a single storage line and is accordingly provided only with an appropriate X-deflection waveform derived from a generator AXTB (Fig. 3) forming part of the main waveform generating unit WFGU. Such waveform generator AXTB comprises a conventional sawtooth waveform generator as is shown and described, for example, in "Cathode Ray Tube Displays," M. I. T. Radiation Laboratory Series, vol. 22, 1948 (published by McGraw-Hill), in section 4.6 on pages 132–139. The circuit shown in Fig. 4.41 on page 134 is a suitable arrangement, the gating signal applied to the input terminal being the S waveform of Fig. 2s to be described later. Preferably, as is usual with cathode ray tube deffection circuits, paraphase outputs are employed on the opposed pair of deflecting plates. These may be obtained by the use of a circuit as shown in Fig. 4.47 on page 139 of the same reference text book. The various elements of the computing section are required to be operative only at those portions of each operative bar when computation is proceeding and are accordingly stimulated at those times by a suitable waveform supplied over lead 40.

The series of trigger circuits FTC10–FTC19 whose purpose is to staticise the function digits, namely, the last ten digits, of an instruction word, are of conventional form having their triggering input leads 38 connected by way of "and" gates GC10–GC19 to those output leads 27 which come from the last ten trigger circuits STC10–STC19 of the main store staticisor MSTR. These function trigger circuits are reset to their "off" or "0" condition by a pulse input over the common reset lead 39.

The output lead 37 from the computing section CMPR feeds through "and" gate G7 to each of twenty "and" gates GD0–GD19 whose respective outputs provide alternative triggering inputs to the trigger circuits STC0–STC19 of the main store staticisor MSTR. These gates GD0–GD19 and also the series of gates GB0–GB19 already referred to, are respectively controlled by the related p-Pulse waveforms p0–p19 of a group of waveforms each comprising a single pulse in time synchronism with the different digit positions of the signal pulse train which represents the number being dealt with in the serial mode. The form and generation of these p-Pulses will be described in greater detail later.

In addition to being made available to the computing section CMPR, the outputs on leads 27 from the trigger circuits STC0–STC9 of the main store staticisor MSTR can be applied through "and" gates GC0–GC9 to the main store time base unit MSTB, those of the first five circuits STC0–STC4 to the group of X-deflection control leads 21 and those of the remaining five circuits STC5–STC9 to the group of Y-deflection control leads 22. The gate circuits GC0 . . . GC9 and those already referred to, GC10 . . . GC19, are controlled by potentials applied through the "or" gate G8.

The output on leads 27 from all of the trigger circuits STC0–STC9 of the main store staticisor MSTR are also made available through "and" gates GE0–GE19 respectively to the write input leads 16 of the tubes T0–T19 of the main stores MS. The series of gates GE0 . . . GE19 are controlled by potentials applied through "and" gate G9 and "or" gate G10.

*Outline of operation*

In broad outline, the operation of the arrangement is as follows: The X and Y time base circuits in unit MSTB are each to set to zero whereby the beam in each tube of the main store MS operates on the address position "0" in line "0." This position is reserved for the storage of the Control Instruction number. The gates GA0–GA19 are then opened and such Control Instruction number is transferred to the staticisor MSTR so that the trigger circuits STC0–STC19 become set up according to such Control Instruction number. Unity is added to the setting of the staticisor circuits by feeding in a pulse through gate G5 whereby the Control Instruction number held on the staticisor trigger circuits is increased by one. The various Present Instructions which define, respectively, each one of the sequential steps of the computing operation are stored, in the usual manner, at sequential address positions in the main store MS, that is to say, the first Present Instruction at a location such as position 1 in line 0 of each tube, the next or second Present Instruction in position 2 of line 0 in each tube, the third Present Instruction in position 3 of line 0 in each tube and so on whereby each Present Instruction can be selected in turn merely by increasing the value of the binary number signalled by the address-selecting digits of the Control Instruction by unity. In such Control Instruction the first or least significant five digits signal which of the 32 available positions within any one storage line of the raster pattern on the storage tubes in the main store MS is required while the second five digits signal which of the 32 lines is required. The existing Control Instruction defined the address in the main store of the Present Instruction which was obeyed at the last preceding bar. The new C. I. number will therefore define the address of the next P. I. of the series.

The new Control Instruction number is then transferred back into the main store MS at the same address location, i. e. position "0," line "0" in each tube through the gates GE0–GE19.

The time base circuits of unit MSTB are then reset in accordance with the address defined by the first ten digits of the C. I. number held in the staticisor MSTR by opening gates GC0–GC9. The gates GC10–GC19 are also opened but the function trigger circuits FTC10–FTC19 of the computing section CMPR are not affected as all of these digits of the C. I. number are "0." The main store MS is now operative at the new C. I. address.

The staticisor trigger circuits STC0–STC19 are next reset to zero and gates GA0–GA19 then opened again to feed the Present Instruction number from the new C. I. address in the main store MS to the staticisor MSTR so that such P. I. number is now set up on such staticisor trigger circuits. The first ten digits of this P. I. number define the address in the main store MS which is to be concerned in the actual computing step while the last ten digits, called the friction digits, define the type of operation and other essential factors. The new setting of the staticisor trigger circuits STC0–STC9 is then used to reset the main time base unit MSTB to the main store address required during the actual computation step by again opening gates GC0–GC9; at the same time the various function digits of such P. I. number serve to operate the function staticisor circuits FTC10–FTC19 of the computing section CMPR through the also opened gates GC10–GC19. The staticisor MSTR is then again cleared to zero.

The subsequent operation depends upon the type of computing operation which has been ordered by the setting of the function staticisor circuits FTC10–FTC19 of the computing section CMPR. If an Outward Transfer from the main store MS to the computing section CMPR has been ordered, the gates GA0–GA19 are again opened to transfer the number held at the main store address defined by the Present Instruction to the staticisor MSTR so as to set the staticisor trigger circuits STC0–STC19 to hold that number. The next step, in which conversion from parallel to serial form takes place, is caused by the opening of the gate G6, and also each of the gates GB0–GB19 one at a time in sequential manner by the related p-Pulses whereby the number stored on the main store staticisor MSTR is converted into serial form and is fed over lead 30 to the computer section CMPR. During this feeding the required mathematical operation as called for by the setting of the function staticisor trigger circuits FTC10–FTC19 is carried out in known manner.

If, on the other hand, an Inward Transfer from the computing unit CMPR to the main store MS was ordered by the function digits of the P. I. number then gate G7 is opened instead to pass an output serial pulse train from the computing section to each of the gates GD0–GD19 which, being controlled to open sequentially by the p-Pulse series, serve to select one digit of the serial pulse train for operating the related staticisor trigger circuit whereby the series of circuits STC0–STC19 become set up with number signalled by the series pulse train. This setting of the staticisor MSTR is then transferred to the main store MS at the selected address by opening gate circuits GE0–GE19. This completes one operative cycle or bar.

The relatively long time interval (20 digit intervals) involved in the conversion to serial form from parallel form does not involve use of the main store and systematic regeneration of the information thereon, 20 positions in each bar, is carried out during this interval.

Waveform generation

Fig. 2 illustrates the various controlling waveforms. The basic operating rhythm comprises a digit interval of 10 microseconds and this interval is the time period allotted to each of the Action A1–A5 and Quiescent beats Q1–Q6. The scanning beat S in which conversion from parallel to series form or vice versa takes place is of 20 digit-intervals length.

Figure 3:
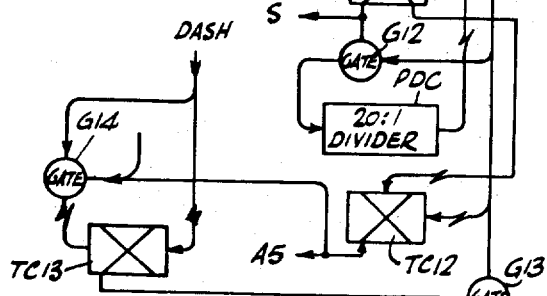
Fig. 3 is a block schematic diagram of the arrangements for generating certain basic timing waveforms in the machine.

The basic timing or rhythm control of the machine is performed by the arrangements comprised in the basic waveform generator unit WGU and illustrated in Fig. 3 comprising a 100 kc./s. master oscillator or clock pulse generator CPG. This device comprises any suitable form of crystal-controlled thermionic valve oscillator providing a stable frequency sine wave output. One suitable device is described in the above quoted reference of "Waveforms," M. I. T. Radiation Laboratory Series, vol. 19, in connection with Fig. 4.9 on page 109. The output from this oscillator is applied through an assymetrical pulse-squaring circuit DWG. Such circuit DWG may be of any conventional form such as an arrangement as described in "Radio Engineers Handbook" by F. E.Terman, 1943 (published by McGraw-Hill), page 970, Fig. 76. The required degree of assymetry of time duration of the positive and negative half cycles is obtained by suitably adjusting the relative bias potentials applied to the opposite halves of the double-diode clipper stages shown in that figure. The output of this circuit DWG is available in two forms one, the Dash waveform shown in diagram a of Fig. 2 comprising a negative going-pulse of six microseconds duration in each digit interval which, from the aspect of the various beats A1, Q1 . . . is measured from the positive-going rear edge of one Dash pulse to the similar rear edge of the next. A paraphase version of this waveform, the Inv. Dash waveform forms the other output from the generator DWG and is shown in diagram b, Fig. 2.

The Dash waveform output is applied to a further waveform generator DTG which may comprise a monostable trigger circuit of the type referred to in the aforesaid reference "Waveforms," vol. 19, M. I. T. Radiation Laboratory Series in connection with Fig. 5.10 on page 168. Such circuit is supplied with each negative-going Dash waveform at its input trigger point and is arranged by suitable selection of the capacitor C and resistance R to have a generated pulse time of 2 microseconds duration so as to provide a series of negative-going pulses of some two microseconds duration and whose leading edges are coincident in time with those of the similar edges of the Dash waveform. This, the Dot waveform, is shown in diagram c, Fig. 2. The Dot waveform is applied to a further waveform generator SWG which is similar in form to the generator DTG and which again may be as described in connection with Fig. 5.10 of the aforesaid reference "Waveforms" and arranged with a pulse generation time of 1 microsecond to provide the Strobe waveform shown in diagram d, and which comprises a series of narrow one microsecond pulses delayed slightly behind the leading edges of the Dash and Dot waveforms.

The Dash waveform output from generator DWG is also applied through "and" gate G11 to the various circuits of a pulse separator arrangement PPS which provides the series of p-Pulses of which a representative selection are shown in diagrams e–h, Fig. 2. This pulse separator arrangement PPS comprises a chain of twenty combined trigger circuit and gate devices PS0 . . . PS19. The gate circuit of each device is controlled by the state of the associated trigger circuit whereby it is open to pass a Dash signal present on lead 201 when the trigger circuit is in one condition and closed to prevent the passage of such signals when the trigger circuit is in the opposite condition. The trigger gate circuits themselves are interconnected with adjacent circuits on each side so that the pulse output available from one trigger circuit resets the trigger circuit preceding it in the chain to its opposite or off condition and also, by its trailing edge, alters the state of the next following trigger circuit. In this way the first pulse available on lead 201 passes through the gate circuit associated with the device PS0 whereafter the next device PS1 is altered in condition to open its gate. This causes return of the first device PS0 to its original state whereby its associated gate is closed. The next arriving pulse on lead 201 therefore passes through the device PS1 and this in turn sets the following device PS2 to open its gate and returns PS1 to close its gate whereby the third pulse on lead 201 passes through the device PS2 and so on, the last device PS19 being back-connected to the device PS0 whereby the cycle of events repeats itself. By reason of the provision of gate G11, opened only in the scanning beat S, these p-Pulses are provided only during such scanning beat and in consequence and as shown in Fig. 2 the first or p0 pulse coincides in time with the Dash pulse occurring during the first digit-interval s0 of the 20-digit scanning beat. The second, p1-Pulse similarly coincides with the Dash pulse of the second digit interval s1 of the Scanning beat and so on.

The gate controlling waveforms defining the beat periods are generated by the arrangements shown in Fig. 4 and which comprise a series of trigger circuits, arranged as described with reference to Figs. 11a, 11b, which are triggered one from another but which are individually reset. The first trigger circuit TC1 is supplied with the Prepulse waveform to be described later, as a triggering input and is reset by the Inv. Dash waveform. In consequence it is active for one digit-interval immediately following the release of a Prepulse and provides the waveform shown in diagram i, Fig. 2. The reversion of this trigger circuit to its reset condition causes triggering of the next trigger circuit TC2 which in similar manner remains operated for one digit-interval until reset by the following Inv. Dash pulse and so provides the A1 waveform shown in diagram j, Fig. 2. The trigger circuit TC3 provides the Q2 waveform of diagram k, Fig. 2, in similar manner and trigger circuits TC4, TC5, TC6, TC7, TC8, TC9 and TC10 similarly provide the further waveforms A2, Q3, Q4, A3, Q5, Q6 and A4 respectively as shown in related diagrams of l–r of Fig. 2.

Retriggering of trigger circuit TC10 at the end of the A4 beat period causes triggering of a further trigger circuit TC11 whose output provides the scanning beat waveform S. This S output wave is applied to an "and" gate G12 which controls the supply of Inv. Dash pulses to a pulse dividing circuit PDC which may be the "phantastron" type as described in U. S. A. Patent No. 2,549,874 to F. C.

Williams, filed July 21, 1947 (issued April 24, 1951), and which provides an output pulse for every 20 applied input pulses. These output pulses are fed back as a retriggering medium for the trigger circuit TC11 which accordingly provides a waveform defining an active S beat of 20 digit-periods only as shown in diagram s, Fig. 2.

Resetting of the S trigger circuit TC11 causes triggering of a further trigger circuit TC12 whose output provides the A5 waveform of diagram t, Fig. 2.

The Prepulse waveform or starting signals previously referred to and indicated in diagram u, Fig. 2, comprises selected Inv. Dash pulses which are passed through "and" gate G13 when the latter is opened by the triggered condition of a further trigger circuit TC13. The latter is itself triggered by means of a Dash pulse released through gate G14 which is normally open only during the A5 beat by the application of the A5 waveform. This gate can however be opened also by certain external controls such as manual input mechanism which will not be described. The trigger circuit TC13 is accordingly triggered during the Dash period of the A5 beat and accordingly opens gate G13 which allows passage of the next following Inv. Dash pulse to form the Prepulse signal at the beginning of the next beat which will form the initial or Q1 beat of the next bar. Circuit TC13 is retriggered during the early part of such new Q1 beat by the leading edge of the Dash pulse in that beat.

The time base circuits for unit MSTB require for one phase of their operation a series of counter waveforms CX0, CX1, CX2, CX3 and CX4 and CY0, CY1, CY2, CY3 and CY4. These counter waveforms are each waveforms of the type shown in diagrams v and w of Fig. 2 and comprising, when active, square pulses with the pulse length of each successive waveform double that of its predecessor, i. e. the pulse length of the CX0 waveform is one digit period for each half-cycle, that of the CX1 waveform two digit periods for each half cycle and so on.

Figure 5:
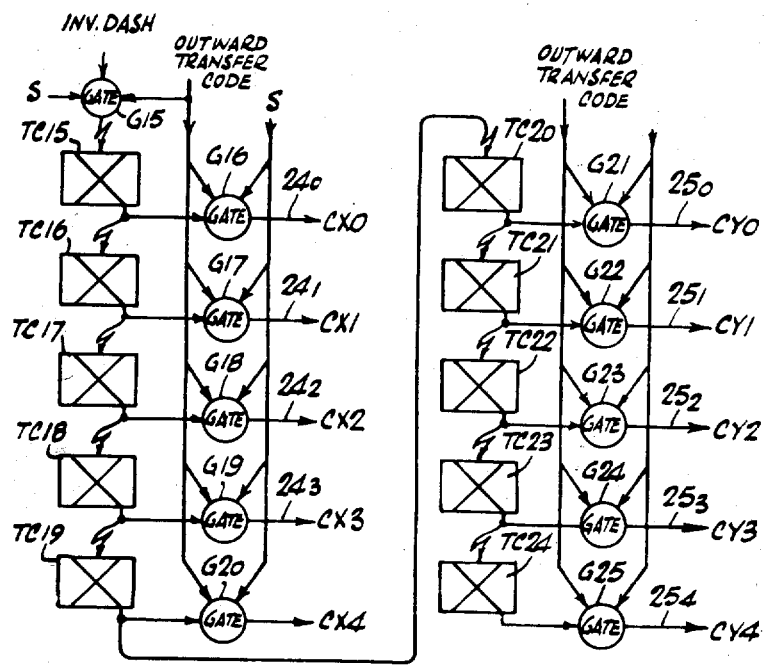
Fig. 5 is a further block schematic diagram of the arrangements for generating various counter waveforms required to effect systematic regeneration on the various cathode ray tube storage devices in the main store of the machine.

Such counter waveforms are provided by the generator CWG, Fig. 1a. The form of such generator is shown in Fig. 5 and comprises a series of trigger circuits TC15–TC24 which are arranged to be triggered serially in the manner of a counter chain. The input trigger to the first circuit TC15 is by way of a gate circuit G15 which is controlled by the S waveform and an Outward Transfer Code signal derived from the function trigger circuits FTC10–FTC19 to allow Inv. Dash pulses to serve as a trigger input only during the S beat periods when outward transfer operations are taking place. In consequence, the setting of this trigger circuit chain is advanced by 20 digit positions in succession during each of such scanning beat periods. The output from each trigger circuit TC15–TC24 is fed through controlling gates G16–G25 which, like the gate G15 are each open only during the operative beat period of the S waveform under the required outward transfer conditions. As a result of this arrangement a series of square waveforms are available which are effective only during the scanning beats and which are continually altering in predetermined manner at each digit-interval of such beats in a manner generally similar to the counter waveforms of the stepped voltage generator described in the aforesaid reference A, more particularly in connection with Figs. 23 and 24 on page 90 of the reference.

The arrangement of the circuits within the time-base unit MSTB is shown in Fig. 6 although only one of the ten separate circuits is shown in detail as the remainder are exactly similar. The first five circuits TB0 . . . TB4 serve to control the X-deflection output potential whereas the other five circuits TB5 . . . TB9 serve to control the Y-deflection output potential.

Referring now to the first circuit TB0 this comprises two valves V1, V2 cross-connected between their anodes and suppressor grids to form a flip-flop trigger circuit which can be set with valve V2 conducting by application of a negative potential to the control grid of valve V1 either from control lead $21_0$ through diode D1 or from control lead $24_0$ through diode D2. The circuit can be reset to the opposite condition with valve V1 conducting by application of a negative potential to the control grid of valve V2 over the resetting lead 23.

The control grid of valve V1 is connected by way of resistance R1 to a source of positive potential while the voltage excursion of the anode of valve V2, which constitutes the output point of the circuit, is limited in each direction by the diodes D3, D4 connected, as shown, to potential sources of +200 and 80 volts respectively.

The anode of valve V2 is connected through a resistance RL0 to the control grid of a summation valve $V_s1$ which closely resembles the Y-shift valve of the arrangement described in connection with Fig. 23 of the aforesaid reference A. This control grid is connected to a source of negative potential by way of resistance R2 while the anode of the valve $V_s1$ is connected through its load resistance R3 to the high-tension supply source and also to the output lead 19 leading to the X-deflection plates of the cathode ray tubes in the main store MS.

The control lead $21_0$ is that one of the group 21 which is capable of access to the first trigger circuit STC0 of the staticisor MSTR while the other control lead $24_0$ is that one of the group 24 which comes from the gate G16 (Fig. 5) and carries the CX0 waveform when available.

The remaining circuits TB1 . . . TB4 are precisely similar except for their connection to the remaining leads $21_1$ . . . $21_4$ and $24_1$ . . . $24_4$ of the lead groups 21 and 24. The anode of valve V2 of circuit TB1 is connected to the grid of the summation valve $V_s1$ by way of resistance RL1 which has a resistance value which is one half that of the resistance RL0. The anodes of the similar valves V2 of circuits TB2–TB4 are likewise connected to the control grid of valve $V_s1$ through resistances RL2, RL3 and RL4 which have resistance values ¼, ⅛ and ¹⁄₁₆ that of resistance RL0. By this means the output potential at the anode of valve $V_s1$ will alter by a unit step as the circuit TB0 is turned on or off, by two unit steps as the circuit TB2 is altered and so on to provide a total of 32 different values according to the different combinations of settings available. When all the circuits are in the reset condition with valves V1 conducting the output potential from valve $V_s1$ corresponds to beam deflection in the tubes of the store MS to position 0; when all the circuits are triggered, the output potential corresponds to position 32 in the tubes of the store MS.

The other five circuits TB5–TB9 are precisely similar and cooperate with the second summation valve $V_s2$ to provide a similar range of 32 different values of output potentials in accordance with the control exercised over the leads $22_0$–$22_4$ of the group 24 from the staticisor MSTR or the leads $25_0$–$25_4$ of the group 25 from the counter circuit CWG.

The resetting lead 23 is common to all circuits and is supplied with Prepulses through "or" gate G28 and with Inv. Dash pulses through "and" gate G29 which is controlled by the Q5 waveform and also by the S waveforms fed through "and" gate G30 which is opened only upon the occurrence of an Outward Transfer, i. e. from the main store MS to the computing section CMPR and signalled by appropriate setting of the function staticisor trigger circuits FTC10–FTC19.

In addition to the above described waveform generating devices, the computing section CMPR will require the various further control waveforms such as an X-deflection waveform extending over the 20-digit period of the Scanning beat S and a related Blackout waveform. The X-deflection waveform is provided by the generator AXTB, Fig. 3, already described while the necessary Blackout waveform is provided by an inverted version of the S waveform, Fig. 2s.

When the storage within the tubes T0–T19 of the main store MS is by the dot-dash method described in reference A in section 3.2 on page 87, a further deflecting waveform, in either X- or Y-direction will be needed for the various tube beams. This is shown in diagram $x$, Fig. 2, and may be derived from the circuit XTBS of Fig. 3 which is controlled by the Dash waveform. Such circuit device XTBS may comprise, like the generator AXTB, Fig. 3, a sawtooth generator controlled by an input gating pulse so as to produce one saw-tooth cycle with the linear rundown portion during the time of the applied gating pulse as described and shown in "Cathode Ray Tube Displays," vol. 22, M. I. T. Radiation Laboratory Series at page 134, Fig. 4.41. As previously mentioned it is preferable to employ paraphase outputs on the deflecting plates of the associated cathode ray tube and such outputs may be derived from a circuit such as that shown in Fig. 4.47 on page 139 of the same "Cathode Ray Tube Displays" reference. A suitable Blackout waveform for use in the tubes T0–T19 in this method of operation is provided by the Inv. Dash waveform.

*Detailed description of operation*

In this machine the "1" binary digit is signalled by a negative going (Dash) pulse and the "0" binary digit by the absence of such a pulse from the particular digit position or channel which determines its significance in the binary scale.

The start of each operative bar is signalled by the release of a Prepulse, Fig. 2 ($u$), brought about either automatically following the setting of the trigger circuit TC13, Fig. 4, in beat A5 at the end of the previous bar or by a manual starting signal or other means. This Prepulse resets to zero, the time base circuits of unit MSTB over lead 23, Figs. 1 and 6, each of the trigger circuits STC0–STC19 of the staticisor MSTR over lead 28 and each of the function trigger circuits FTC10–FTC19 of the computing section CMPR over lead 39. The beams in each of the cathode ray tubes T0–T19 of the main store MS accordingly operate at the address 0, 0 reserved for the Control Instruction (C. I.). These resetting operations are completed during the first beat, Q1 which is one digit-interval in length and is determined by the Q1 waveform, Fig. 2 ($i$).

In the next following beat, A1, the A1 waveform Fig. 2 ($j$) applied through gate G1 opens each of the gates GA0–GA19 for one digit interval. During this interval any "1" output signal appearing on any of the output leads 14 from the main store MS is passed to the input lead 26 of the associated trigger circuit of the main store staticisor MSTR and triggers the latter into its "1" indicating condition whereby, at the end of the beat period, the trigger circuits STC0–STC19 of the staticisor record, in parallel static form, the Control Instruction number previously held in the main store MS. This particular C. I. number is that which was used in the preceding bar and needs to be increased by unity in order to define the next of a sequential series of P. I. numbers.

During the next following beat Q2, the Q2 waveform, Fig. 2 ($k$), opens the gate G5 for one digit-interval thereby allowing entry of the coincident Dash pulse to the common triggering input lead 29 of the first trigger circuit STC0 of the main store staticisor MSTR. In consequence of the counter chain interconnection of the trigger circuits STC0–STC19 the number represented by the setting of these is increased by unity, giving the new C. I. number defining the address in the main store MS of the next Present Instruction to be obeyed.

In the next following beat A2, the A2 waveform, Fig. 2 ($l$), is fed through gate G10 and opens all of the gates GE0–GE19 for one digit-interval whereby the various potentials on the output leads 27 from the staticisor MSTR which represent, in static parallel form, the new C. I. number are applied to the input leads 16 of the related storage tubes T0–T19 of the main store MS where they operate upon the write units 15 of each tube device and cause the new Control Instruction number to be written into the main store at the allotted C. I. position 0, 0 in place of the previous number.

In the next following beat, Q3, the Q3 waveform, Fig. 2 ($m$), is fed through gate G8 and opens each of the gates GC0–GC19 for one digit-interval. The staticisor trigger circuits STC0–STC19 still remain set up with the new C. I. number and the output potentials on leads 27 from the first ten trigger circuits STC0–STC9 are accordingly made available to the input lead groups 21, 22 of the time base unit MSTB, the first five trigger circuits STC0–STC4 being connected to leads $21_0$–$21_4$ of the section XTB, Fig. 6, and the second five trigger circuits STC5–STC9 being connected to the leads $22_0$–$22_4$ of the section YTB, Fig. 6. The output potentials at the anodes of the summation valves Vs1, Fig. 6, are accordingly altered to values which produce the requisite deflection of the beams of the tubes T0–T19 of the main store to operate upon the selected address in the latter of the required Present Instruction. As the last ten digits of any C. I. number are always "0" the opening of gates GC10–GC19 will not affect the zero setting of the function trigger circuits FTC10–FTC19 of the computing section CMPR.

In the following beat, Q4, the Q4 waveform, Fig. 2 ($n$), comprising a pulse of one digit-interval in length, is applied to gate G4 so as to allow the coincident pulse of the Inv. Dash waveform to reset the trigger circuits STC0–STC19 back to zero. Due to their trigger circuit formation, the time base circuits still retain their previous setting, i. e. at the P. I. address in the store MS.

In the following beat A3, the A3 waveform, Fig. 2 ($o$), and again comprising a one digit-interval pulse is fed through gate G1 so as again to open the gates GA0–GA19 to connect the output leads 14 of the main store MS to the triggering inputs 26 of the related staticisor trigger circuits STC0–STC19 whereby the latter become set up according to the address and function digit values contained in the Present Instruction held at the chosen P. I. address in the main store.

In the next following beat, Q5, the Q5 waveform, Fig. 2 ($p$), first allows the coincident Inv. Dash pulse to pass through gate G29, Fig. 6, to reset the various time base circuits to zero condition. At the same time it passes through gate G8 to open gates GC0–GC19 and so allows the outputs on the first ten leads 27 to be applied to the lead groups 21 and 22 of the time base unit MSTB which is accordingly reset to the address specified in the Present Instruction. The potentials on the remaining ten leads 27 are applied through the remaining gates GC10–GC19 to the function trigger circuits FTC13–FTC19 which accordingly become set up in accordance with the function operation specified by the Present Instruction.

In the next following beat Q6, the Q6 waveform, Fig. 2 ($q$), is applied to gate G4 to allow the coincident Inv. Dash pulse to effect resetting of each of the trigger circuits STC0–STC19 on the staticisor MSTR back to zero. The time base unit MSTB, however, still retains the setting which it has previously been given, namely, that of the number address in the main store which is eventually to be used while the function staticisor circuits FTC10–FTC19 of the computing section CMPR likewise remain set.

In the next following beat, A4, the operation is dependent upon the nature of the function operation to be carried out and as signalled by the setting of the function staticisor circuits FTC10–FTC19. The setting of these circuits is used in conventional manner and by way of decoding devices to provide controlling potential whose existence or non-existence is dependent upon the presence or absence of specific combinations of "1" or "0" significance among the function digits of the Present Instruction.

If the instruction to be carried out is one, known as an Outward Transfer instruction involving transfer of a number from the main store MS to the computing sec tion CMPR, the function staticisor circuits FTC10–FTC19 will cause the provision of an Outward Transfer Code signal during the whole of the time period during which the function staticisor is set up, namely from beat Q5 until the end of beat A5. Such Outward Transfer Code signal is derived from the outputs of the function staticisor FTC10 . . . FTC19 by suitable decoding arrangements which may take the form of an "and" or coincidence gate circuit such as already described in connection with Figs. 8a and 8b. Thus if the 10 most significant or "function" digits of each Present Instruction have two of them, such as the 11th and 12th digits of the 20-digit word, allocated to control of the direction of transfer, Outward Transfer (i. e. from the Main Store MS) being signalled by such digits having respectively the binary values "0" and "1" and the opposite direction of Inward Transfer (i. e. into the main store MS), by the same two digits being of binary values "1" and "0," then a suitable decode circuit for deriving a signal in response to an Outward Transfer instruction (01$\delta\delta\delta$ $\delta\delta\delta\delta\delta$— where $\delta$ indicates that it is immaterial what the digit value is) would comprise a two input "and" gate of the type shown in Fig. 8b having one input connected to the left hand or "1"—representing output terminal of the trigger circuit FTC10 and the other having its input connected to the right hand or "0"—representing output terminal of the trigger circuit FTC11. Thus only when the trigger circuit FTC10 is in its triggered state and the trigger circuit FTC11 is in its reset state at the same time is an output obtained from the gate output terminal for use as an Outward Transfer control signal. Any other combination of the function digits which does not include this specific arrangement of the 11th and 12th digits will not provide any output control potential. Similarly under the opposite or Inward Transfer condition, a further two input "and" gate having one of its inputs connected to the "0" or right hand output terminal of trigger circuit FTC10 and its other input connected to the left hand or "1" output terminal of trigger circuit FTC11 provides an output control potential only when the function digits of the Present Instruction are of a combination which includes value "0" for the 11th digit and the value "1" for the 12th digit of the function digit staticisor sections.

Under such Outward Transfer Condition with the application of such code signal to gates G2 and G6, gate G2 will allow the A4 waveform, Fig. 2 (r) and comprising a pulse of one digit interval in length, to pass through gate G1 and cause yet a further opening of the gates GA0–GA19. In similar manner to that of previous operations, the output signals on the output leads 14 of the main store MS cause the setting up of the trigger circuits STC0–STC19 of the staticisor MSTR with the number stored at the selected address of the main store MS.

If on the other hand, instead of an Outward Transfer being called for, an Inward Transfer from the computing section CMPR to the store MS is required, then the function staticisor circuits FTC10–FTC19 will have a different configuration which, by means of the other decoding circuit as described above will provide an Inward Transfer code signal which is applied to gates G7 and G9 only. In consequence, the gate G2 will not be opened during the A4 beat and this beat is, in effect, a Quiescent one as no action takes place therein.

The next following beat is the scanning beat, S, which is of 20 digit-intervals duration and is defined by the scanning or S waveform, Fig. 2 (s).

Assuming first, the Outward Transfer condition, the simultaneous occurrence of the Outward Transfer code signal and the S waveform will open gate G6 during the whole of the scanning beat. Access from the (parallel) output leads 27 of the main store staticisor MSTR which is now holding the selected number, to the single (serial) input lead 30 of the computing section CMPR is still prevented by the gate series GB0–GB19 but these are opened in succession by the related p-Pulse waveforms $p0$–$p19$ which occur one in each of the 20 successive digit intervals $s_0, s_1 \ldots s_{19}$ of the scanning beat S. In consequence any "1" representing negative potential on the output leads 27 of the main store staticisor MSTR is passed to the input lead 30 during its related digit interval so that the parallel static form of signal on the staticisor is converted into a dynamic serial pulse train which can be used within the serial type circuits of the computing section CMPR in known manner.

Under the opposite conditions of Inward Transfer, the number which is to be transferred to the main store MS is available in serial pulse train form on the output lead 37 of the computing section CMPR. The gate G7 in such outward lead 37 is opened during the S beat under Inward Transfer conditions whereby the serial pulse train is fed through said gate G7 to each of the gates GD0–GD19. These are individually controlled by the related p-Pulse waveforms whereby they open in succession one during each digit-interval of the scanning beat and in consequence any "1" digit pulse present in the serial pulse train will be segregated and fed as a triggering input to the lead 26 of the related trigger circuit of the main store staticisor MSTR. The main store staticisor accordingly again becomes set up, this time with the number which is to be transferred to the main store MS.

In the next and final beat A5, the A5 waveform Fig. 2 (t), again of one digit-interval in length, is ineffective during Outward Transfer code conditions but during Inward Transfer code conditions is fed through the gate G9 opened by the Inward Transfer code signal and through gate G10 to cause a second opening of the gate series GE0–GE19 which allow transference of the potentials on the output leads 27 from each of the staticisor trigger circuits STC0–STC19 to the input leads 16 controlling the writing of information in the related tubes T0–T19 in the main store.

During the scanning beat S the main store MS is out of use and the opportunity is taken to effect its regeneration. As regeneration of only 20 out of the total of 1024 separate address positions can be effected during any one scanning beat means must be provided for ensuring that each address location periodically regenerated with sufficient frequency to ensure continued storage. This is effected by transferring the control of the time base circuits of unit MSTB from the staticisor MSTR to the counter waveform generator CWG. As shown in Fig. 6 each of the separate five trigger circuits of the X and Y-sections XTB and YTB have an alternative control input by way of the leads $24_0$–$24_4$ and $25_0$–$25_4$ which are connected to the corresponding outputs of the counter circuits shown in Fig. 5. The latter are stepped on in their counting action once during each digit-interval of the scanning beat through the control gate G15 and the continually changing square output waveforms from the various trigger circuits causes the progressive setting up of the XTB section (Fig. 6) in each of its 32 different positions in turn, the Y-time base YTB section being similarly changed but at a much slower rate since its controlling counter waveforms are altered by one step only once for every complete group of 32 steps by the X-time base section. In consequence regeneration takes place systematically in groups of 20 digits along each of the X lines in turn in the storage tubes.

The counter circuit chain is cut off from access to the time base circuits and from its triggering input at the end of each scanning beat S which is usable for regeneration and thus retains its configuration until the next regeneration period when counting continues from the point where it ceased previously.

As it is necessary, under Inward Transfer conditions for the main time unit MSTB to retain the address setting which it was given in the preceding beat Q5, the resetting of the time base trigger circuits to zero and their subsequent transfer to the counter circuits CWG must be prevented and no regeneration is accordingly effected during such inward transfer operations. This is achieved by the application of the Outward Transfer code signal to the various gates G15–G25 and G30. As the number of Inward Transfer operations is relatively small there is no serious deceleration of the frequency of regeneration.

The requisite binary numbers for representing the number and instruction data items for a computation may be loaded into the main store MS in a variety of ways. For example, use may be made of the Inward Transfer facility previously described, the required number for any particular address location in the main store having been previously written into the accumulator storage tube 31 by supplying such number to the input lead 30 by a branch connection (not shown).

Figure 7:
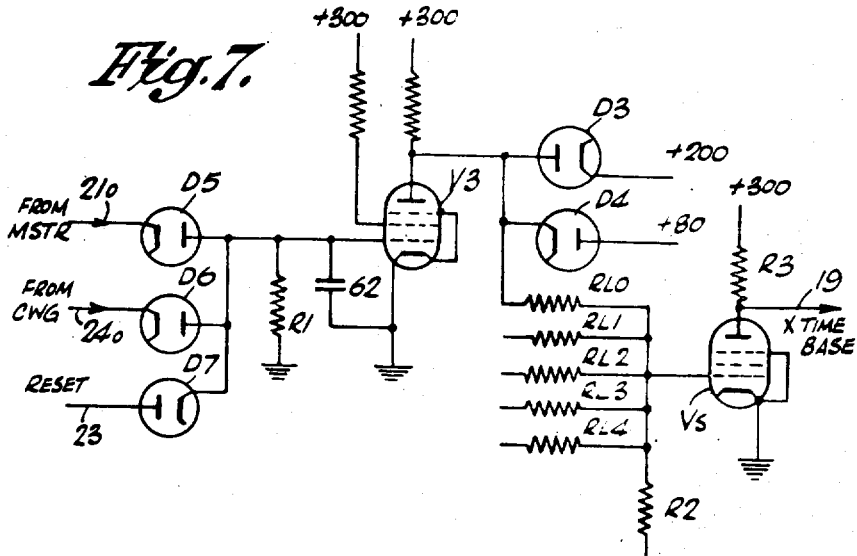
Fig. 7 is a circuit diagram showing one stage of an alternative time base arrangement.

A variety of modifications may clearly be made without departing from the scope of the invention. For example, the form of the time base circuits may vary widely. One alternative construction is shown in Fig. 7 of the drawings in which the trigger circuit of valve V1, V2 in Fig. 6 is replaced by an amplifier valve V3 to the control grid of which is connected a, so-called, "shuffle" circuit comprising a condenser 62. The control grid of the valve is connected to earth by way of a resistance R1 and is also connected to the input leads from the staticisor and the counter MSTR waveform generator CWG and also to the source of positive-going resetting pulses through diodes D5, D6 and D7 respectively. Such "shuffle" circuit operates by reason of the charge held upon the condenser 62. Thus with the reset waveform applied to lead 23 being at its normal negative resting level, the arrival of a negative pulse on either of the input leads 210 or 240 will drive the control grid of the valve V3 negative, the diodes D5 and D6 acting as a buffer or "or" gate. The condenser 62 is thus charged negatively to the control grid and this charge will continue to hold the valve V3 cut off even after the negative input pulse has decayed since the two diodes D5 and D6 will now be non-conductive owing to their anodes being more negative than their cathodes while the diodes D7 will still have its anode resting at the normal negative level of the Reset waveform. Such cut-off condition of valve V3 is maintained since the leakage through resistance R1 is only slight due to the high value given to that component and this state of affairs will persist until the arrival of a positive-going reset pulse on lead 23. This reset pulse by raising the voltage at the anode of D7 above that of its cathode, causes that diode to become conductive and thereby to discharge condenser 62 and so turning on valve V3 once again. Such an arrangement operates as a delayed action device being triggered by an input pulse but remaining held in its triggered condition until subsequently released by the reset pulse. The output circuit arrangement of the valve V3 and its interconnection with the summation valve Vs is identical with the previously described construction.

Certain of the Quiescent or Q beats may be dispensed with if necessary provided suitable precautions are taken to ensure that the resetting and retriggering operations which then have to be carried out in the same beat period are properly and reliably effected without mutual interference. In one modification of this kind a total of nine beats sufficed, namely A1, Q1, A2, Q2, A3, Q3, A4, S and A5.

Although the computing section has been assumed of the simplest character it will be clear that all of the usual facilities including those of transfer of control involving replacing the C. I. address content and of transfers to and from an associated subsidiary, e. g. magnetic store may be included.

I claim:

1. An electronic digital computing machine comprising data storage means having a plurality of unique address locations, one for each of a plurality of number and instruction data items each comprising a predetermined number of digits, address selecting means for said storage means for rendering any chosen one of said address locations available externally, said storage means having a plurality of separate output channels, one for each digit storage location of any one of said data item address locations and being constructed to operate in the parallel mode in which each of the individual digit-representing signals of the data item of the selected address location is transmitted simultaneously over a different one of said plurality of output channels and wherein the significance of each of said digit-representing signals is determined by the identity of the output channel in which it occurs, a computing circuit constructed for operation in the series mode and having a single signal input channel over which the individual digit-representing signals of a data word are transmitted sequentially as a signal train and wherein the significance of such digit-representing signals is determined by their time of occurrence in the train of signals, and parallel-to-series signal converting means connected between said plurality of output channels of said storage means and said single input channel of said computing circuit.

2. An electronic digital computing machine comprising data storage means operating in the parallel mode and having a plurality of unique address locations for each of a plurality of number and instruction data words, address selecting apparatus for said storage means for rendering any chosen one of said address locations available externally under the control of an applied address selection signal, master rhythm control means for said machine comprising timing means defining a plurality of equal digit time-intervals and rhythm control means for determining each operative cycle of said machine as composed of a predetermined number of said sequential digit time-intervals, computing apparatus controlled by computing control signals and operating with signals in the series mode, parallel-to-series signal converting means connected between said parallel mode storage means and said series mode computing means and a control system governed by said rhythm control means providing address selection signals for said address selecting apparatus and computing control signals for said computing apparatus for performing sequential operations with said parallel mode apparatus each in single digit intervals of said machine rhythm and for performing an operation with said computing means in a pre-determined number of successive digit intervals of said machine rhythm.

3. An electronic digital computing machine comprising data storage means having a plurality of unique address locations for each of a plurality of number and instruction data words, address selecting apparatus for said storage means for rendering any chosen one of said address locations available externally under the control of an applied address selecting signal, said storage means operating in the parallel mode to present each digit storage location of any separate address separately available on an individual lead, master rhythm control means for said machine comprising timing means defining a plurality of equal digit time-intervals and rhythm control means for determining each operative cycle of said machine as composed of a predetermined number of said sequential digit-time intervals, computing apparatus operating under the control of computing control signals with number signals applied in the series mode to a single input terminal, parallel-to-series signal converting means connected between the separate leads of said parallel mode store and the single lead of said series mode computing means and a control system governed by said rhythm control means providing address selecting signals for effecting the performance of all operations of said parallel mode apparatus in eleven single digit intervals of said machine rhythm and computing control signals for effecting performing of said computing apparatus in an extended length time period consisting of a pre-determined number of said digit-intervals.

4. An electronic digital computing machine comprising main data storage means operating in the parallel mode and comprising a plurality of separate storage units each having a separate signal output channel and each capable of storing a plurality of individual digit values at unique address locations therein, common address selecting means for each of said storage units, said address selecting means being controlled by a common address selecting signal to provide a parallel mode output signal representing a data item as a digit representing voltage on each of said separate signal output channels from said storage units and in which the significance of each output digit of said selected instruction or number is determined by the channel occupied thereby, computing apparatus having a single signal input channel for performing a desired arithmetical operation with number-representing signals applied in series pulse train form to said single input channel and parallel-to-series signal converting means between the output channels of said parallel mode apparatus and the input channel of said series mode apparatus.

5. An electronic digital computing machine comprising main data storage means operating in the parallel mode and having a plurality of separate cathode ray tube storage units each capable of storing a plurality of individual digit-representing signals at unique address locations within a predetermined area of each tube screen, address selecting means for each of said units and comprising separate X-direction and Y-direction tube beam deflecting means for each tube, a common X deflection waveform generator supplying all of said X-direction beam deflecting means in parallel and a common Y-deflection waveform generator supplying all of said Y-direction beam deflecting means in parallel, control apparatus for governing said X and Y beam deflection waveform generators to cause said main data storage means to provide a parallel mode output signal representing the various digits of an instruction or a number upon different ones of a plurality of separate output channels and in which the significance of each output digit-representing signal is determined by the channel occupied thereby, computing apparatus operating in the series mode for performing a desired arithmetical operation with a number represented by an applied pulse signal train and parallel-to-series signal converting means connected between the said parallel mode storage apparatus and said series mode computing apparatus.

6. An electronic digital computing machine according to claim 5 which includes a control system for controlling the machine operation in accordance with the form of an instruction selected from said main data storage device under the control of a control instruction and in which said control instruction is located at a predetermined address location in said data storage means, and which includes control number altering means for automatically changing the control number held at said predetermined address location during each operation cycle of the machine.

7. An electronic digital computing machine according to claim 6 in which said predetermined address location for said control instruction is one lying at one extreme of the X and Y deflection ranges provided by said X and Y deflection waveform generators.

8. An electronic digital computing machine according to claim 7 in which said predetermined address location is one of position 0 in line 0 of a scanning raster provided by said X and Y deflection waveform generators.

9. An electronic digital computing machine comprising main data storage means operating in the parallel mode and having a plurality of separate cathode ray tube storage units each capable of storing a plurality of individual digit-representing signals at unique address locations within a predetermined area of each tube screen, address selecting means for each of said units and comprising separate X-direction and Y-direction tube beam deflecting means for each tube and a common X deflection waveform generator supplying all of said X-direction beam deflecting means in parallel and a common Y-deflection waveform generator supplying all said Y-direction beam deflecting means in parallel, control apparatus for governing said X and Y beam deflection waveform generators to select any chosen one of a range of discrete positions for said beams upon the tube screens in accordance with the nature of X and Y deflection control signals applied to said beam control apparatus a regenerative loop system for each of said storage units, a separate output terminal for each of said storage units, a computing apparatus controlled by a computing control signal and operating in the series mode and having single input and output terminals for performing a desired arithmetical operation with a number represented by a pulse signal train applied to said input terminal, parallel-to-series converting means having a plurality of input leads connected one to each of said storage unit output terminals and a single output terminal connected to said input terminal of said computing apparatus, a control system for said machine providing X and Y deflection control signals for said beam control apparatus to provide under the control of a machine instruction, a parallel mode output signal on said plurality of output terminals of said storage units representing the contents of a chosen address in said store followed by a computing control signal by which said parallel mode number is converted to serial form and dealt with in said computing apparatus and a series of further X and Y regeneration deflection control signals during the period of operation of said computing apparatus for effecting regeneration of a group of separate storage address locations in said main storage means.

10. An electronic digital computing machine according to claim 9 wherein said X and Y beam deflection waveform generators each comprise a plurality of bistable trigger circuits each having triggering control terminals and an output terminal providing a current output of one or the other of two different values according to the condition of the trigger circuit, a first common resistor connected to receive the currents from all of said output terminals of the trigger circuits of the X beam deflection waveform generator and a second common resistor connected to receive the currents from all of said output terminals of the trigger circuits of the Y beam deflection waveform generator so as to provide across each of said common resistors a potential variable in steps and controlled by the setting state of the associated trigger circuits.

11. An electronic digital computing machine according to claim 10 which includes alternative triggering input paths to each of said trigger circuits, one of said paths of each trigger circuit being connected to said control system for energisation in accordance with said machine instruction and the other of said paths being connected to said control system for energisation by said regeneration deflection control signals.

12. An electronic digital computing machine according to claim 1 in which said storage means also includes a plurality of separate input channels, one for each of said digit storage locations of any one of said data item address locations, and upon which the individual digit-representing signals of a data item to be inserted into an address location selected by said address selecting means are transmitted simultaneously in parallel form, in which said computing circuit has a single signal output channel over which signals are available in serial form, and which includes a series-to-parallel signal converting means connected between said single output channel of said computing circuit and said plurality of input channels of said storage means.

13. An electronic computing machine comprising a plurality of cathode ray tube storage devices each having a plurality of unique address locations each capable of holding one digit of a data item, one digit of each data item being stored at the corresponding address location in each of said cathode ray tube storage devices, a plurality of separate output leads one from each of said storage devices, address selecting beam deflecting means operable by an address selecting signal to render any chosen storage location of said storage devices operative at each of said output leads, a staticisor device comprising a plurality of separate sections one for each of said output leads of said storage device, a plurality of first coincidence gate circuits one for each of said output leads and each having a controlling input terminal, circuit means connecting the output lead of each of said storage devices to the triggering input of a separate one of said staticisor sections through a separate one of said gate circuits, a plurality of output circuits one for each of said staticisor sections, a plurality of second gate circuits each having a controlling input terminal, circuit means connecting the output leads of said staticisor sections through a separate one of said second series of gate circuits to a common lead, a computing device operative in the series mode with a signal pulse train, a source of controlling signals connected in parallel to each of said controlling terminals of said first series of gate circuits and a series of sequential signals supplied respectively one to each of the controlling input terminals of said second series of gate circuits whereby a number represented in parallel form on the plurality of output leads of said storage device may be set up on said staticisor and then made available at said computing device in series form by sequentially opening and closing in turn each of siad second series of gate circuits.

References Cited in the file of this patent

UNITED STATES PATENTS 2,404,047  Flory et al. _____ July 16, 1946

OTHER REFERENCES

Theory and Techniques for Design of Electronic Digital Computers, University of Pennsylvania, lectures given at the Moore School of Electrical Engineering, Nov. 1, 1947; pages 16–16 to 16–18.

A Functional Description of the EDVAC (2 volumes), University of Pennsylvania, Moore School of Electrical Engineering, Nov. 1, 1949, Research Div., Report 50–9 (under contract W36–034–ORD–7593)

High Speed Computing Devices, Engineering Research Associates, McGraw-Hill Book Co., Inc. (copyright July 28, 1950), pages 267–268.

A Dynamically Regenerated Electrostatic Memory System by J. P. Eckert, Jr. et al., Proceedings of the IRE, May 1950, pages 498–510.

Proc. of the Inst of Electrical Engineers, volume 98, No. 61, "Universal High Speed Digital Computers" by Williams et al., Feb. 1951, pages 13–34.